United States Patent
Cho

(10) Patent No.: US 7,283,840 B2
(45) Date of Patent: Oct. 16, 2007

(54) RECONFIGURABLE ANALOG BASEBAND FOR A SINGLE-CHIP DUAL-MODE TRANSCEIVER

(75) Inventor: Thomas Cho, Alameda, CA (US)

(73) Assignee: Chrontel, Inc., San Jose, CA (US)

( * ) Notice: Subject to any disclaimer, the term of this patent is extended or adjusted under 35 U.S.C. 154(b) by 530 days.

(21) Appl. No.: 10/773,609

(22) Filed: Feb. 6, 2004

(65) Prior Publication Data

US 2004/0162023 A1    Aug. 19, 2004

Related U.S. Application Data

(60) Provisional application No. 60/445,683, filed on Feb. 7, 2003.

(51) Int. Cl.
*H04M 1/00*    (2006.01)
(52) U.S. Cl. ............... 455/552.1; 455/41.2; 455/127.2; 455/127.3; 455/127.4; 455/245.1; 455/245.2; 455/339; 455/340; 330/98; 330/99; 330/100
(58) Field of Classification Search ............ 455/550.1, 455/552.1, 553.1, 41.1–41.2, 78–88, 127.1–127.5, 455/232.1, 233.1, 234.2, 245.1–245.2, 339–340; 330/98–100
See application file for complete search history.

(56) References Cited

U.S. PATENT DOCUMENTS

| 5,317,277 | A  | * | 5/1994 | Cavigelli .................... 330/109 |
| 6,560,443 | B1 | * | 5/2003 | Vaisanen et al. ............. 455/73 |
| 7,031,668 | B2 | * | 4/2006 | Darabi et al. ................ 455/75 |
| 2003/0124982 | A1 | * | 7/2003 | Saari et al. ................ 455/67.4 |
| 2004/0192222 | A1 | * | 9/2004 | Vaisanen et al. ............. 455/78 |

\* cited by examiner

*Primary Examiner*—Matthew D. Anderson
*Assistant Examiner*—Tuan Tran
(74) *Attorney, Agent, or Firm*—Perkins Coie LLP

(57) ABSTRACT

A dual-mode analog baseband circuit is implementable on a single IC with reduced chip area. The baseband portion of the IC includes a single dual-mode complex filter that is reconfigurable to be a filter for Bluetooth signals or for wireless local area network (wireless LAN) format signals, such as 802.11b, and includes a single dual-mode amplifier that is reconfigurable to amplify Bluetooth signals or wireless LAN format signals.

14 Claims, 4 Drawing Sheets

Bluetooth/WLAN Mode Select Control

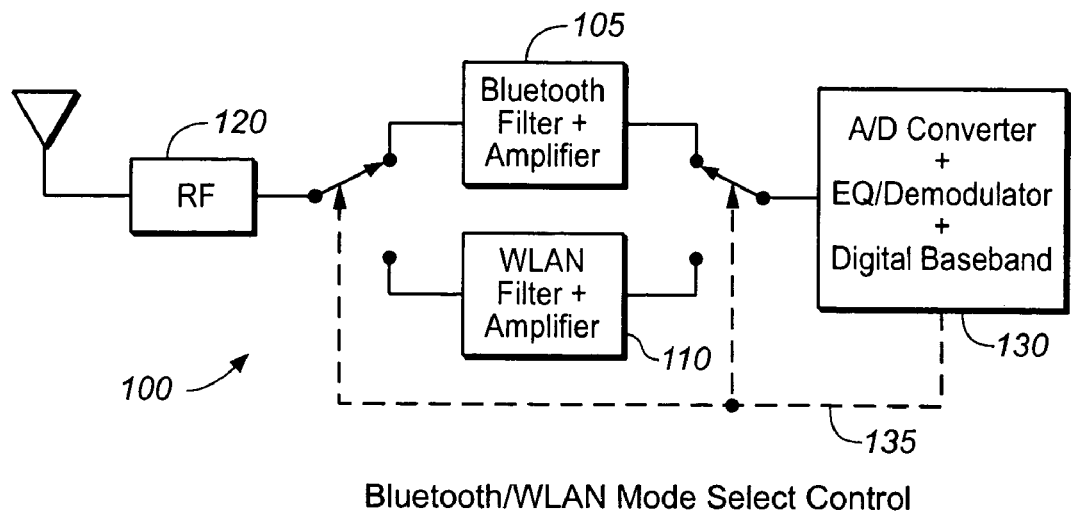
FIG._1
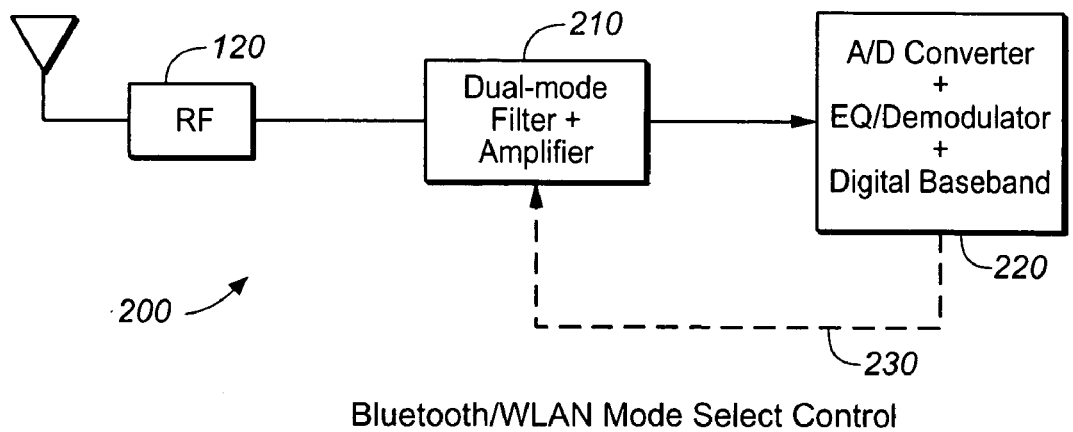
FIG._2

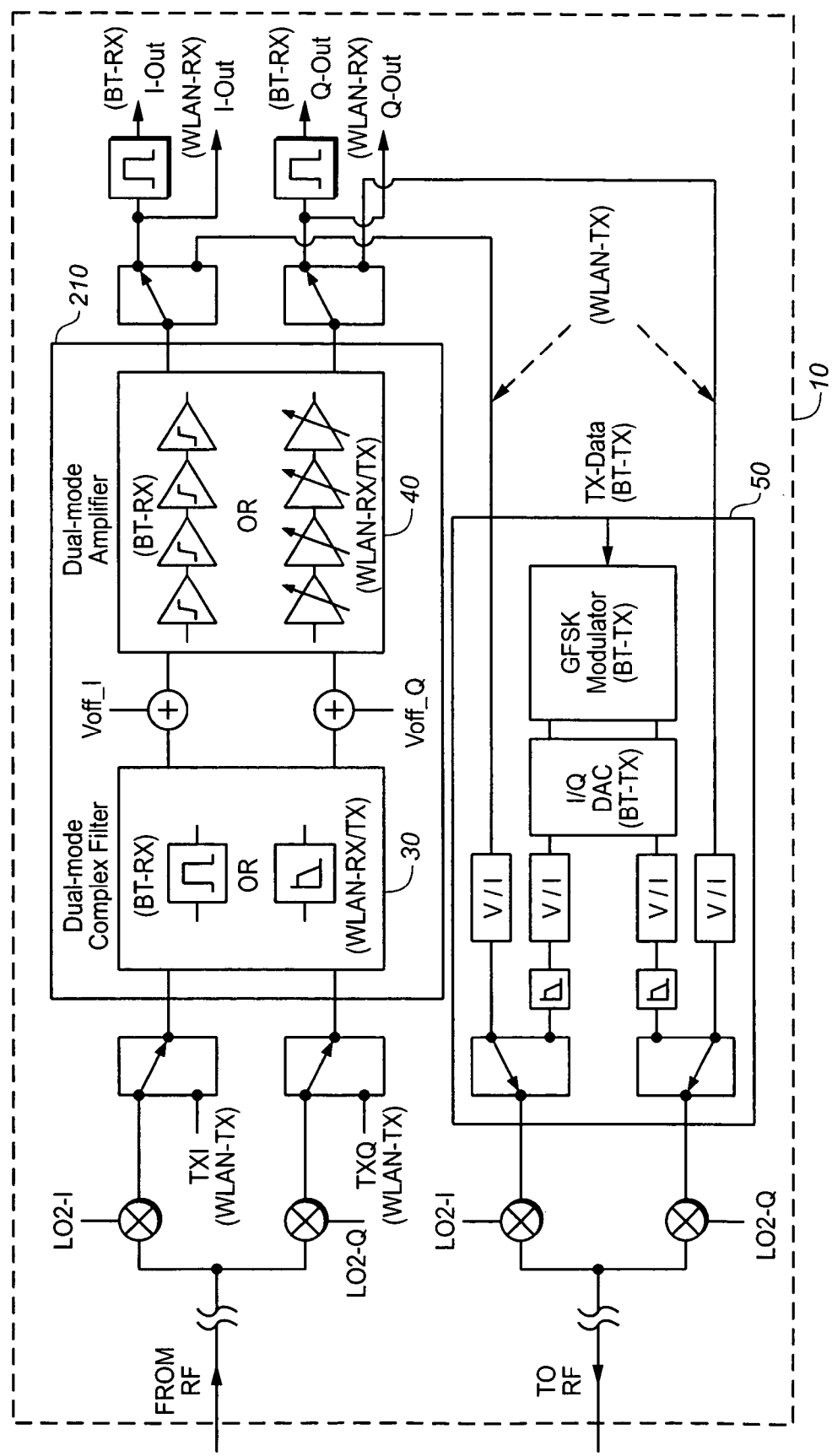
FIG._3

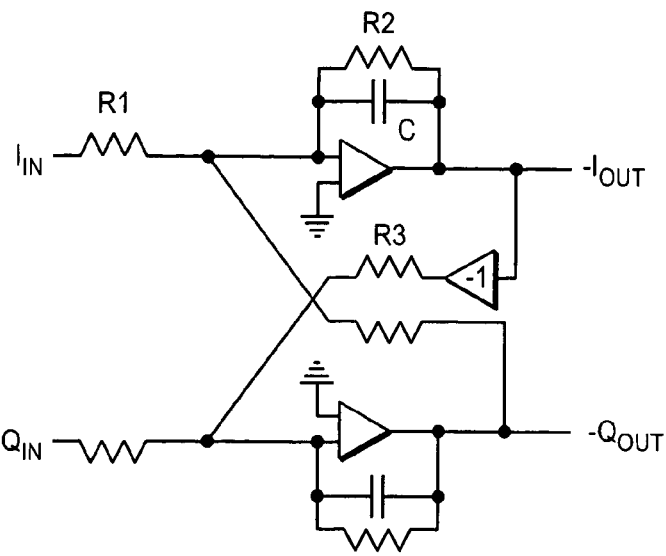
FIG._4A
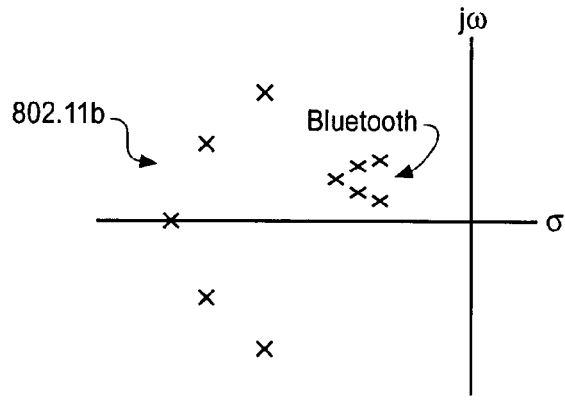
FIG._4B
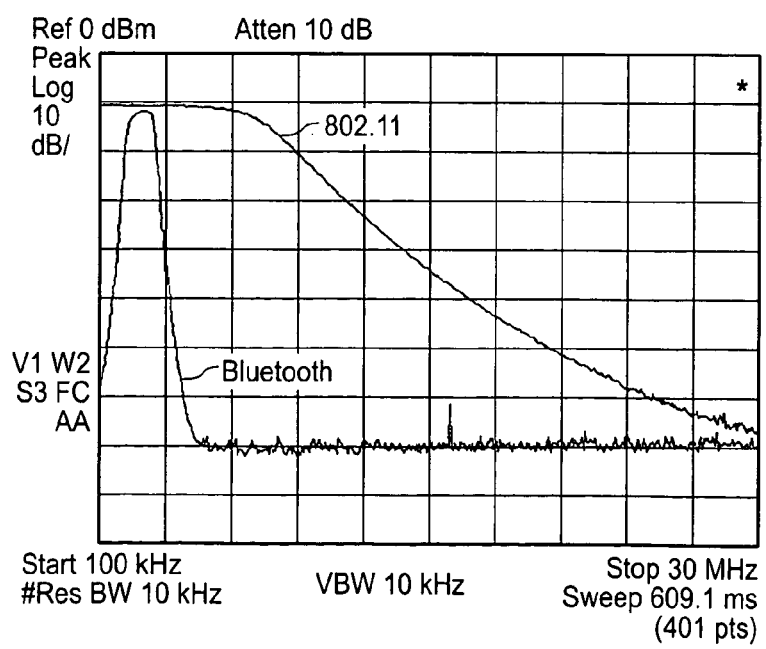
FIG._4C

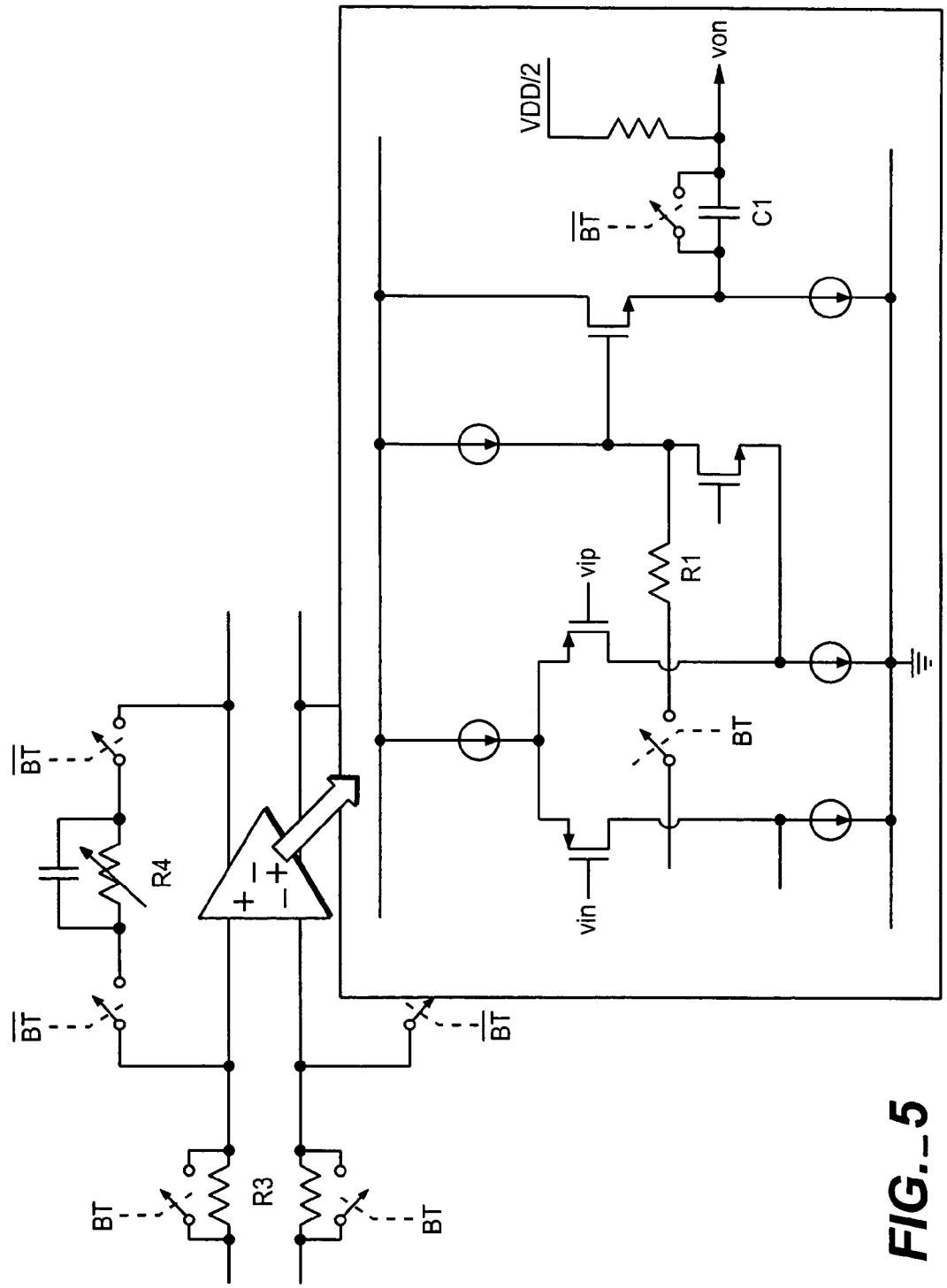
FIG._5

RECONFIGURABLE ANALOG BASEBAND FOR A SINGLE-CHIP DUAL-MODE TRANSCEIVER

CROSS-REFERENCE TO RELATED APPLICATIONS

This application claims the benefit of the filing date of U.S. Provisional Application Ser. No. 60/445,683, filed Feb. 7, 2003 entitled "Reconfigurable Analog Baseband for A Single Chip Dual Mode Transceiver", which application is incorporated herein by reference in its entirety.

FIELD OF THE INVENTION

The invention relates generally to single integrated circuit ("IC") chip implementations of radio transceiver systems and more particularly to high-level systems such as Bluetooth and 802.11b wireless local area network ("WLAN") systems that can be implemented on a single integrated circuit (IC) chip using reduced chip area.

BACKGROUND OF THE INVENTION

As the wireless market rapidly has grown in recent years, a need has arisen for a single wireless transceiver IC that can work with several different wireless protocols, more particularly Bluetooth and 802.11b. Prior art implementations for standalone Bluetooth or 802.11b transceivers are known. Typically, direct-conversion or other RF conversion techniques perform a simple frequency translation between RF and baseband. Post-conversion, most of the channel-select filtering and amplification is carried out in the baseband.

Bluetooth receive (RX) mode, a typically 2.4 GHz RF signal is down-converted to 2 MHz low-IF for channel-select band-pass filtering, limiting, and subsequent band-pass filtering suppresses harmonics from the previous limiting operation. The resultant signals are then passed to a subsequent GFSK demodulator stage.

Using 802.11b protocol, in wireless-LAN (WLAN) RX mode, RF signals are down-converted to DC for channel-select low-pass filtering. The converted signals are then processed through signal amplitude-controlled variable gain amplifiers (VGA's).

Common analog/digital (A/D) converters may be used for the Bluetooth and 802.11b protocol signals to quantize I/Q outputs for equalization and demodulation. Exemplary prior art design approaches for complex filters suitable for Bluetooth transceiver applications may be found in J. Crols and M. Steyaert, "Low-IF Topologies for High-Performance Analog Front Ends of Fully Integrated Receivers," IEEE Trans. Circuits Syst.-II, vol.45, pp. 269-282, March 1998, herein incorporated by reference.

The most straightforward approach to provide dual functionality found in the prior art appears to be placing a Bluetooth transceiver IC and a separate 802.11b transceiver IC on a single chip, such as system 100 shown in FIG. 1. Bluetooth filter and amplifier 105 and a separate wireless LAN filter and amplifier 110 are coupled to an RF transmit/receive unit 120 and a digital baseband unit 130. In the system 100, select control signal 135 is applied to switches 140 and 145 to select either the Bluetooth filter and amplifier unit 105 or the wireless LAN filter and amplifier unit 110. To implement the Bluetooth unit 105 and the wireless LAN unit 110, all components for both units are fabricated and laid out separately, consuming chip area.

What is needed is a dual-mode Bluetooth/802.11b baseband circuit that can be implemented with a single IC. Preferably the resultant transceiver would provide a reconfigurable analog baseband that includes a single dual-mode complex filter system, and a single dual-mode amplifier system. Such an IC should be implementable with reduced chip area.

The present invention provides such a dual-mode analog baseband circuit.

SUMMARY OF THE INVENTION

The present invention provides a dual-mode analog baseband circuit, implementable on a single IC. Rather than provide first and second dedicated filters for Bluetooth and for 802.11b (and/or for the related 802.11a or 802.11g standards), a single dual-mode complex filter is provided. Further, rather than provide first and second dedicated amplifiers for Bluetooth and for 802.11, a single dual-mode amplifier is provided. As a result, the analog baseband can be implemented using perhaps 60% of the area compared to using two separate baseband circuits. The resultant IC enables dual-mode receive functionality for Bluetooth and 802.11b (and/or 802.11a or 802.11g) wireless LAN.

BRIEF DESCRIPTION OF THE FIGURES

FIG. 1 is a block diagram of a transceiver having separate Bluetooth and wireless LAN filters and amplifiers, according to the prior art.

FIG. 2 is a block diagram of a transceiver having a dual-mode filter and amplifier, according to an example of the present invention.

FIG. 3 is a high level block diagram of a dual-mode poly-phase channel-select filter and dual-mode amplifier dual-mode transceiver, according to the present invention;

FIG. 4A depicts a single stage (shown with single-ended input) of a dual-mode poly-phase five-pole Butterworth channel-select filter, according to the present invention;

FIG. 4B depicts exemplary re-configurable pole locations for a five-pole Butterworth filter comprising five cascaded single-pole stages, such as shown in FIG. 2A, to implement a dual-mode complex filter, according to the present invention;

FIG. 4C depicts the transfer function for a five-pole Butterworth dual-mode complex filter, according to the present invention; and FIG. 5 depicts a single stage in a dual-mode amplifier system, according to the present invention.

DETAILED DESCRIPTION OF THE PREFERRED EMBODIMENT

A block diagram of a transceiver 200 having dual-mode functionality according to an embodiment of the present invention is shown in FIG. 2. The RF receiver/transmitter 120 is coupled to a dual-mode filter and amplifier unit 210. The dual-mode filter amplifier unit 210 is further coupled to digital baseband unit 220. In this manner, dual-mode filter and amplifier unit 210 includes a filter operable as either a Bluetooth filter or a wireless LAN filter. The dual-mode filter includes at least one component shared by both modes. Similarly, the unit 210 includes a dual-mode amplifier unit operable as either a Bluetooth amplifier or a wireless LAN amplifier. The dual-mode amplifier includes at least one component share between both modes. Accordingly, chip area is conserved relative to the prior art embodiment of FIG. 1 through the dual-use chip components. The digital baseband unit 220 is configured to generate a mode select control signal 230 and provide this signal to the dual-mode filter and amplifier unit 210. The mode select control signal selects operation of the filter and amplifier unit 210 to filter and amplify Bluetooth signals, or wireless LAN signals, as needed.

While the dual-mode unit 210 is depicted in FIG. 2 as having both a dual-mode filter and a dual-mode amplifier, described further below, it is to be understood that in some embodiments, a dual-mode filter is provided coupled to separate amplifier units, one for Bluetooth operation and one for wireless LAN operation. In other embodiments, a single dual-mode amplifier is provided coupled to separate filter units, one for Bluetooth operation and one for wireless LAN operation.

As will be appreciated in the art, the dual-mode filter and amplifier unit 210 may be implemented in a wide variety of ways. FIG. 3 depicts an integrated circuit (IC) 10 that includes an embodiment of the dual-mode filter and amplifier unit 210. As described herein, the dual-mode filter and amplifier unit 210 includes a dual-mode complex filter 30 and a dual-mode amplifier unit 40.

In receive (RX) mode, an incoming RF signal (typically 2.4 GHz) is mixed with relevant local oscillator signals (LO2-1, LO2-2) and the mixer output coupled to a dual-mode complex filter 30, according to the present invention. The local oscillator signals depend upon the RF front-end architecture of the transceiver, and present invention can be used with a range of local oscillator frequencies.

In FIG. 3 it is to be appreciated that in the prior art, a filter would be provided solely to filter Bluetooth compatible signals. Applicant is unaware of any prior art IC that provides the dual-mode Bluetooth/802.11 format functionality of the present invention. While this description directly addresses the Bluetooth and 802.11b configurations, it will be understood that the invention may be applied to other of the 802.11 configurations such as but not limited to 802.11a, and 802.11g, as well as to other 802.11 enhancements, improvements, extensions, and standards that may be implemented in the future, as well as variants of Bluetooth and other wireless standards.

In FIG. 3, the signal outputs from filter 30 are coupled as input to dual-mode amplifier 40, according to the present invention. It is to be appreciated that, but for the present invention, the functionality of the dual-mode amplifier unit 40 would likely be implemented using separate amplifiers, one amplifier dedicated to filtering Bluetooth compatible signals, and a second amplifier dedicated to filtering 802.11b format compatible signals.

In practice, the chip area required to implement the filter and amplifier 210 portion of a dual-mode transceiver shown in FIG. 3 advantageously can be about 50% less than the chip area required to implement Bluetooth/802.11b functionality by combining a Bluetooth transceiver and an 802.11b transceiver on a common IC. Further, because the baseband portion 210 of IC 10 can be implemented using fewer components, robustness and ease of fabricating IC 10 can be enhanced. As noted in FIG. 3, the RF front end of the overall dual-mode transceiver can be shared.

The dual-mode complex filter is a poly-phase channel-select filter system preferably comprising five single-pole filter units, such as shown in FIG. 4A. However for ease of illustration, the single filter stage shown in FIG. 4A is drawn with single-ended inputs, whereas in practice differential inputs can provide enhanced rejection of noise including rejection of noise from the substrate upon which IC 10 is fabricated. Those skilled in the art of filter design will know how to implement a differential input single-pole filter stage, or a cascade of five such filter stages to provide a five-pole differential dual-mode complex filter.

In Bluetooth mode (abbreviated BT in FIG. 3), dual-mode complex filter unit 30 is characterized by the five pole Butterworth configuration, whose poles are located closest to the origin in the plot shown in FIG. 4B. This fifth-order response has 1 MHz bandwidth, with complex poles located symmetrically about a 2 MHz IF, to reject a -2MHz image. However when filter unit 30 is switched or reconfigured into 802.11 mode (abbreviated WLAN in FIG. 3), the overall Butterworth filter response is exhibited by the five poles located more distance from the origin and symmetrical about the real axis in FIG. 4B. Thus in WLAN RX mode, the complex poles are moved down to DC to perform a fifth-order Butterworth filtering on the baseband I/Q signals, with a 7.5 MHz bandwidth. The filter responses are shown in FIG. 4C. Referring back to FIG. 4A, changing the value of R2 and R3 will reposition the filter poles in the overall filter unit 30 to obtain the desired frequency responses for the dual modes of transceiver operation. Accordingly, referring back to FIG. 2, the mode control signal 230 delivered to the filter and amplifier unit 210 is operable to select the value of R2 and R3, in this embodiment, to select the mode of filter operation. Implementing filter unit 30 requires less than about 20% overhead in area for the extra resistor layout and associated switches to implement the dual functionality filter responses. This is considerably less overhead than fabricating two separate filters. Preferably a master tuning circuit corrects the IC fabrication process and temperature variation of the RC time constant for the implementation shown in FIG. 4A.

Thus, it will be appreciated that the ability to provide a single dual-mode complex filter structure whose frequency response can be dynamically controlled to be characterized by the five-pole 802.11b configuration or by the Bluetooth configuration shown in FIG. 4B contributes to reduced chip area in implementing filtering on IC 10.

In FIG. 3, after channel-select filtering by the complex filter unit 30, signals are coupled as input to dual-mode amplifier stage 40, an exemplary stage of which is shown in FIG. 5. In Bluetooth mode, dual-mode amplifier stage 40 is configured as four-stage limiters with AC coupling, each stage exhibiting about 15 dB of gain. Resistor R1 and bias current for the associated operational amplifier set the amplitude of the limiter output, while C1 and R2 set the AC coupling high-pass corner frequency. The following third-order band-pass filter then removes the 6 MHz harmonic distortion from the limiter output. However in 802.11b WLAN mode, dual-mode amplifier stage 40 is reconfigured as a four-stage voltage gain amplifier (VGA). In this configuration mode, the total gain range is adjustable from 0 to 60 dB in 1 dB increments, as set by the resistance ratio R4/R3. The VGA stages are DC-coupled, with the first stage preferably having an extra input to cancel DC offset. Advantageously the same operational amplifiers within unit 40 are used to implement the multi-state limiter Bluetooth configuration mode, and the VGA 802.11b WLAN configuration mode. Referring back to FIG. 2, the mode select control signal 230 is further operable, in this embodiment, to close the appropriate switches in FIG. 5 in each mode. In Bluetooth mode, the switches labeled BT in FIG. 5 are closed and the switches labeled $\overline{BT}$ are open. In wireless LAN mode, the switches labeled BT are open and the switches labeled $\overline{BT}$ are closed.

Modifications and variations may be made to the disclosed embodiments without departing from the subject and spirit of the invention as defined by the following claims.

What is claimed is:

1. A transceiver operable to process Bluetooth compatible signals and wireless local area network compatible (WLAN-compatible) signals, the transceiver comprising:
    a radio-frequency unit;
    a digital baseband unit configured to generate a mode control signal indicative of a Bluetooth-compatible mode or a WLAN-compatible mode;
    a dual-mode filter and amplifier unit having a first Bluetooth-compatible mode and in said second mode, the dual-mode filter and amplifier unit coupled to the radio frequency unit and digital baseband unit and configured to select an operating mode from the first Bluetooth-compatible mode and second WLAN-compatible mode responsive to said mode control signal;
    the dual-mode filter and amplifier unit comprising a dual-mode amplifier further comprising:
        at least a first stage having an operational amplifier that is in use during both the first Bluetooth-compatible mode and the second WLAN-compatible mode;
        at least a first feedback component including at least one resistor;
        at least a first switch coupled to said feedback component and said operational amplifier having a first mode and a second mode, such that in said first mode the dual-mode filter and amplifier is operable in said first Bluetooth-compatible mode and the feedback component is disconnected from said operational amplifier and in said second WLAN-compatible mode the dual-mode filter and amplifier is operable in said second WLAN-compatible mode and the feedback component is coupled between an input and an output port of said operational amplifier;
        said first feedback component including a resistor and a capacitor coupled to said first feedback component and said first switch; and
        the dual-mode filter and amplifier being responsive to the mode control signal through a plurality of switches to change the operation between the Bluetooth-compatible mode configuration and the second WLAN-compatible mode configuration so that:
            (i) during operation in the first Bluetooth-compatible mode the dual-mode filter and amplifier is configured as four-stage limiters with AC coupling, a first resistor and a bias current for the operational amplifier setting the amplitude of the limiters output, and a first capacitance C1 and a second resistance R2 setting the AC coupling high-pass corner frequency; and
            (ii) during the second WLAN-compatible mode the dual-mode filter and amplifier is configured as a four-stage voltage gain amplifier and the total gain range is set by the resistance ratio (R4/R3) of a fourth resistance R4 to a third resistance R3, and the four voltage gain amplifier stages are DC coupled.

2. A transceiver according to claim 1, wherein the dual-mode filter and amplifier unit comprises a dual-mode filter having at least one component in use during both the first Bluetooth-compatible mode and the second WLAN-compatible mode.

3. A transceiver according to claim 2, wherein said at least one component includes a transistor.

4. A dual-mode amplifier unit having a first Bluetooth-compatible mode, and having a second WLAN-compatible mode, the amplifier comprising:
    at least a first stage having an operational amplifier that is in use during both the Bluetooth-compatible mode and the second WLAN-compatible mode;
    at least a first feedback component including at least one resistor; and
    at least a first switch coupled to said feedback component and said operational amplifier having a first mode and a second mode, such that in said first mode the dual-mode amplifier unit is operable in said first Bluetooth-compatible mode and the feedback component is disconnected from said operational amplifier and in said second mode the dual-mode amplifier unit is operable in said second WLAN-compatible mode and the feedback component is coupled between an input and an output port of said operational amplifier;
    said first feedback component includes a resistor and a capacitor coupled to said first feedback component and said first switch;
    the dual-mode amplifier unit being responsive to a mode select control signal through a plurality of switches to change the operation between the first Bluetooth-compatible mode and the second WLAN-compatible mode so that:
        (i) during operation in the first Bluetooth-compatible mode the dual-mode amplifier unit is configured as four-stage limiters with AC coupling, a first resistor and a bias current for the operational amplifier setting the amplitude of the limiters output, and a first capacitance C1 and a second resistance R2 setting the AC coupling high-pass corner frequency; and
        (ii) during the second WLAN-compatible mode the dual-mode amplifier units configured as a four-stage voltage gain amplifier and the total gain range is set by the resistance ratio (R4/R3) of a fourth resistance R4 to a third resistance R3, and the four voltage gain amplifier stages are DC coupled.

5. a dual-mode amplifier unit according to claim 4, wherein said first feedback component includes a resistor.

6. A dual-mode amplifier unit according to claim 4, further comprising a capacitor coupled to said first feedback component and said first switch.

7. A dual-mode amplifier unit according to claim 4, wherein during operation in said first Bluetooth-compatible mode, said first stage operates as a limiter.

8. A dual-mode amplifier unit according to claim 4, wherein during operation in said second WLAN-compatible mode, said first stage operates as a voltage gain amplifier.

9. A transceiver including a dual-mode analog baseband having reduced IC chip area, the transceiver including a dual-mode amplifier unit according to claim 4, coupled to a dual-mode complex filter having a first Bluetooth-compatible mode and a second WLAN-compatible mode and comprising at least one adjustable component operable to select said first Bluetooth-compatible mode or said second WLAN-compatible mode.

10. A transceiver according to claim 9 wherein said filter and said amplifier are formed on a single semiconductor substrate.

11. a dual-mode amplifier unit having a first Bluetooth-compatible mode, and having a second WLAN-compatible mode, the amplifier comprising:
    at least a first stage having an operational amplifier;
    at least a first feedback component;

at least a first switch coupled to said feedback component and said operational amplifier having a first mode and a second mode, such that in said first mode the dual-mode amplifier unit is operable in said first Bluetooth-compatible mode and the feedback component is disconnected from said operational amplifier and in said second mode the dual-mode amplifier unit is operational in said second WLAN-compatible mode and the feedback component is coupled between an input and an output port of said operational amplifier; and a capacitor coupled to an output of said operational amplifier and at least a second switch coupled to said capacitor, such that during operation in said first Bluetooth compatible mode, said capacitor at least in part determines an AC coupling corner frequency of said first stage.

12. A method to implement a dual-mode amplifier unit having a first Bluetooth-compatible mode, and having a second WLAN-compatible mode, the method comprising:

providing at least a first stage having an operational amplifier;

providing at least a first feedback component;

coupling at least a first switch having a first mode and a second mode to said feedback component and said operational amplifier, such that in said first mode the dual-mode amplifier unit is operable in said first Bluetooth-compatible mode and the feedback component is disconnected from said operational amplifier and in said second mode the dual-mode amplifier unit is operable in said second WLAN-compatible mode and the feedback component is coupled between an input and an output port of said operational amplifier; and the dual-mode amplifier unit being responsive to a mode control signal to change the operation between the Bluetooth-compatible mode and the second WLAN-compatible mode so that:

(i) during operation in the first Blue-tooth compatible mode the dual-mode amplifier unit is configured as four-stage limiters with AC coupling, a first resistor and a bias current for the operational amplifier setting the amplitude of the limiters output, and a first capacitance C1 and a second resistance R2 setting the AC coupling high-pass corner frequency; and (ii) during the second WLAN-compatible mode the dual-mode amplifier units configured as a four-stage voltage gain amplifier and the total gain range is set by the resistance ratio (R4/R3) of a fourth resistance R4 to a third resistance R3, and the four voltage gain amplifier stages are DC coupled.

13. A dual-mode amplifier unit according to claim 12, further comprising a capacitor coupled to said first feedback component and said first switch.

14. A method to provide an IC with reduced chip area, the IC including a dual-mode analog baseband, comprising implementing a filter, implementing an amplifier according to the method of claim 12, and coupling said filter and amplifier.

* * * * *